May 1, 1934.  H. J. SMITH  1,956,812

LEAD AND ANGLE INDICATOR

Filed May 21, 1932  3 Sheets-Sheet 1

Inventor
Herbert J. Smith
By Attorneys
Southgate Fay & Hurley

May 1, 1934.  H. J. SMITH  1,956,812
LEAD AND ANGLE INDICATOR
Filed May 21, 1932  3 Sheets-Sheet 2

Inventor
Herbert J. Smith
By Attorneys

May 1, 1934. H. J. SMITH 1,956,812

LEAD AND ANGLE INDICATOR

Filed May 21, 1932 3 Sheets-Sheet 3

Inventor
Herbert J. Smith
By Attorneys

Patented May 1, 1934

1,956,812

UNITED STATES PATENT OFFICE 1,956,812

LEAD AND ANGLE INDICATOR

Herbert J. Smith, Greenfield, Mass.

Application May 21, 1932, Serial No. 612,826

5 Claims. (Cl. 33—199)

The principal objects of this invention are to provide in a simple and compact form a device by which both the lead and the angle of the threads of a screw, tap, or the like, can be indicated accurately and fully to show errors; to provide a construction for supporting a master screw, or a screw or tap to be tested, together with means by which the angle of the screw-thread can be measured to show angle errors in degrees and minutes; to provide means by which the same instrument can be used to show any error in the lead measured by micrometer adjustment, and to provide features of construction by which the measurements are made with great accuracy.

Other objects and advantages of the invention will appear hereinafter.

Reference is to be had to the accompanying drawings, in which

Fig. 3 is a plan of the device;

Fig. 4 is an end elevation partly in section;

Fig. 5 is a sectional view on the line 5—5 of Fig. 4, and

Figure 1:
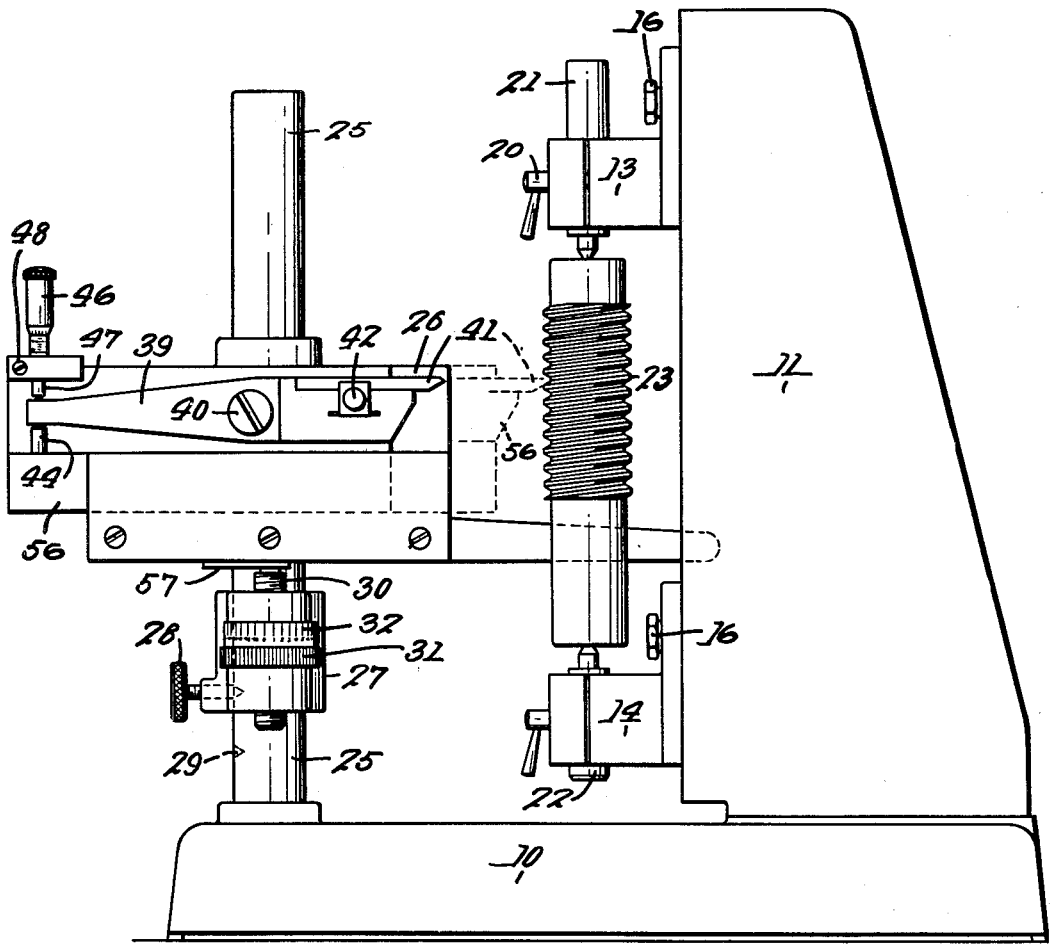
Fig. 1 is a side view of an instrument constructed in accordance with this invention.

The device is shown as comprising a solid base 10 having an upright 11. This upright is provided with ways 12, extending vertically along one side. In these ways are mounted a pair of slides 13 and 14 adapted to be moved to any desired position vertically along the ways and held in position by bolts 9 extending into T slots 15 and having nuts 16 for holding the slides in fixed position after adjustment. Each slide is provided with a V-shaped groove 17 and on the face of each slide is mounted a plate 18 secured in position by a screw 19 on one side and a hand screw 20 on the other. This plate has a space and in that space is located one of the centers 21 or 22 and clamped in position by the screw 20. These two centers constitute means for supporting a master screw or tap, not shown, and also for supporting the screw 23 or tap which is to be tested.

Also extending up from the base 10 is a column 25 of cylindrical shape. On this column is supported a frame 26 carrying a slide 56 and below this slide is a support 27 which is held in any one of several positions by a pointed thumb screw 28 projecting into any one of a number of pointed recesses 29 in the column 25. This support is provided with a vertical screw 30 which is provided with an adjusting wheel 31 having a scale 32 around it. This wheel is carried by anti-friction bearings 34 carried in a recess in the support. The support 27 is split at the back and held in adjusted position by a hand screw 38. The screw 30 can be adjusted to engage the bottom of the frame 26 and support it in the desired or adjusted position. The frame has secured to it a bottom bearing plate 57 against which the plane top of the screw 30 engages.

On this frame 26 is a fixed arm 35 which is provided with an adjusting screw 36 at the end but is otherwise rigid. This adjusting screw is adapted to come into contact with a plane surface 37 on the upright 11 for the purpose of limiting the position of the whole mechanism angularly about the column 25. Also mounted on the slide 56 is a lever 39 pivoted on a stud 40 carried by the slide. This lever is provided with a detachable knife edge 41 held in position by a thumb screw 42 in a recess in the lever in which it is located.

The other end of the lever rests on a spring-pressed plunger 44 and is provided with a bearing ball 45 at the top. Mounted on the slide 56 is a micrometer 46 having a plunger 47 adapted to come into contact with the ball 45 and to adjust this end of the lever up and down, it being understood that the body of the micrometer 46 is secured in fixed position on the slide by means of a screw 48.

Figure 2:
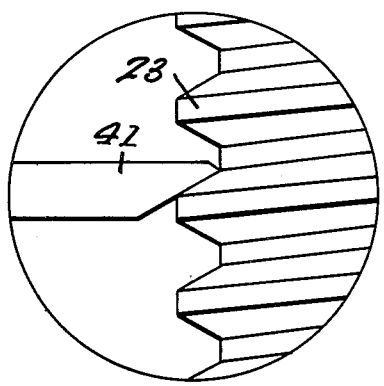
Fig. 2 is a magnified side elevation showing the measuring knife edge in position showing an accurate screw-thread.
Figure 6:
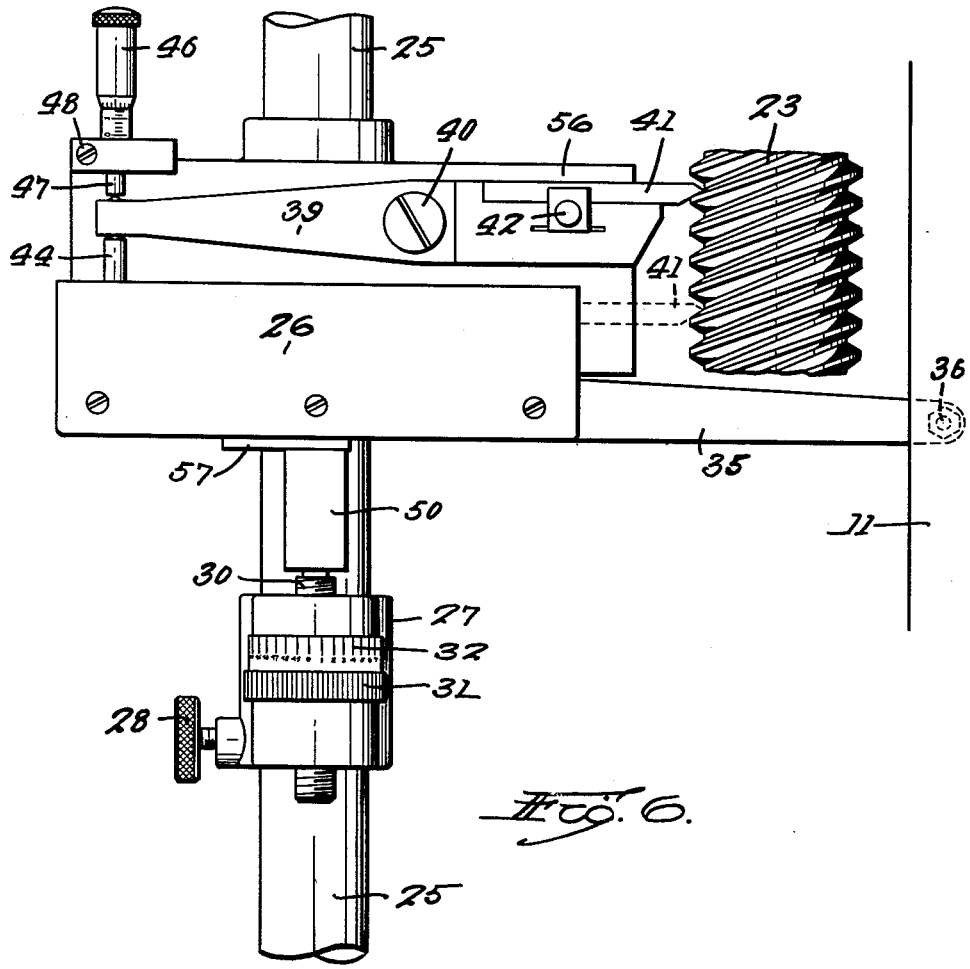
Fig. 6 is a view similar to Fig. 1, showing the method of testing the lead.

In the use of the device for measuring and detecting errors in the angle of a screw, a master screw is first put in place on the centers 21 and 22. The slide 56 is moved toward the screw being tested and adjusted vertically by the wheel 31 until the knife edge 41 is in contact with the flank of the thread. Adjustment of the micrometer 46 is made until the proper contact is obtained as shown in Fig. 2. This adjustment, of course, swings the lever 39 about its pivot and consequently the knife edge until it comes into parallelism with the surface of the master thread. The knife edge 41 can be set to the master thread and the reading on the micrometer 46 noted.

Now the tap or screw 23 to be tested is located in the place of the master screw on the centers 21 and 22. The above described operation is now repeated. The leverage from the pivot stud 40 is made such that each one thousandth of an inch on the micrometer equals one minute on the flank angle, preferably. In this way errors on the angle are easily and quickly obtained in minutes.

Of course, the opposite flank of the thread is tested in the same manner with the knife edge the other side up or rather another knife edge having its angle ground on the opposite side.

Lead errors are measured by swinging the frame 26 about the center of the column 25 until the screw 36 comes in contact with the surface 37 and of course, it can be swung back from that position. By swinging the slide back the knife edge clears the thread being tested. A precision gauge block 50 is now placed between the micrometer anvil 30 and the bottom of the frame 26. This precision gauge block, of course, is of a height exactly equal to the correct lead, so the knife edge is just the right distance from its original position. Now the slide holder is again swung around until the screw 36 engages the surface 37. Now the knife edge will register with the thread in the second position if no error in the lead is present. If the knife edge stands away or interferes with the thread, it is obvious that a lead error is present. This can be measured by the micrometer 31. Note is made, of course, of the reading of this micrometer in the first position. Now the knife edge is adjusted to the proper contact in the second position and the micrometer is again read.

In this way it will be seen that the readings are perfectly accurate and that the errors in angle are shown on the micrometer 46 directly in one thousandths, each one thousandth representing a minute in the angle. Also the errors in lead are shown on the micrometer 32 in direct readings.

Although I have illustrated and described only one form of the invention I am aware of the fact that modifications can be made therein by any person skilled in the art without departing from the scope of the invention as expressed in the claims. Therefore, I do not wish to be limited in this respect but what I do claim is:

1. In a screw or tap testing device, the combination of a base, an upright, a pair of centers on the upright for supporting a master screw or screw or tap to be tested, a cylindrical column extending upwardly from the base, a frame mounted on said column capable of being swung about the column, a slide on the frame, a lever carried by said slide, a knife edge for testing the screw-threads mounted on said lever, and a micrometer means for adjusting the lever about its pivot to correspondingly adjust the knife edge to the screw-threads, said frame having an arm projecting therefrom with adjustable means thereon for engaging the upright and thereby locating the frame angularly in the proper position for the knife edge to engage the screwthread in the proper place.

2. In a device for testing the lead of a screw-thread, the combination with means for supporting a screw, of a column having its axis parallel with the screw, a frame movable up and down the column, a support fixed to the column in adjusted positions and having a screw thereon for supporting the bottom of said frame, a wheel on the screw for adjusting the screw up and down, a micrometer scale connected with the wheel for showing the amount of adjustment, said frame being adapted to rest on the screw, means on the frame for engaging the thread of the screw to be tested, and a precision gauge block adapted to engage the supporting screw and support the frame therefrom, said gauge block having a height equal to the desired lead of the screw, whereby the error can be detected by the micrometer.

3. In a lead indicator for screw-threads, the combination with means for supporting the screw to be tested and a column parallel with the axis of said screw, of a frame movable up and down and rotatable on said column, an arm on the frame having means for limiting the motion of rotation of the frame to a position suitable for testing the screw, a support carried and fixed in adjusted positions on the column, a screw on the support for supporting the frame, means for operating the screw comprising a scale for reading correctly the adjustments of the screw, whereby a precision gauge block can be mounted on the screw for supporting the frame on its top, the gauge block having a height equal to the correct lead of the screw, and means on the frame having an adjustable knife edge adapted to engage the screw-thread for showing when the lead is incorrect.

4. In a lead indicator for screw-threads, the combination with means for supporting the screw to be tested and a column parallel with the axis of said screw, of a frame movable up and down and rotatable on said column, an arm on the frame having means for limiting the motion of rotation of the frame to a position suitable for testing the screw, a support carried and fixed in adjusted positions on the column, a screw on the support for supporting the frame, a wheel for operating the screw having a scale for reading correctly the adjustments of the screw, a precision gauge block adapted to be mounted on the screw and supporting the frame on its top, the gauge block having a height equal to the correct lead of the screw, a transverse slide on the frame, a lever on the slide having a knife edge adapted to engage the screw-thread, and micrometer means for adjusting the lever about its axis, whereby the frame can be set to rest on the top of the screw on the support and the knife edge can be swung inwardly with the frame to engage a screw-thread and thereafter the knife edge can be swung outwardly away from the screw and the precision block inserted in place and the knife edge swung back again to test the lead.

5. In a screw or tap testing device, the combination of a base, means for supporting a master screw or screw or tap to be tested, a column on the base, a frame mounted on said column capable of being swung about the column, a slide on the frame, a lever carried by said slide, a knife edge for testing the screw-threads mounted on said lever, and a micrometer means for adjusting the lever about its pivot to correspondingly adjust the knife edge to the screw-threads, said frame having an arm projecting therefrom with adjustable means thereon for engaging the screw supporting means and thereby locating the frame angularly in the proper position for the knife edge to engage the screw-thread in the proper place.

HERBERT J. SMITH.